A. WHITTEMORE.
Draft-Evener.
No. 165,395.
2 Sheets--Sheet 1.
Patented July 6, 1875.
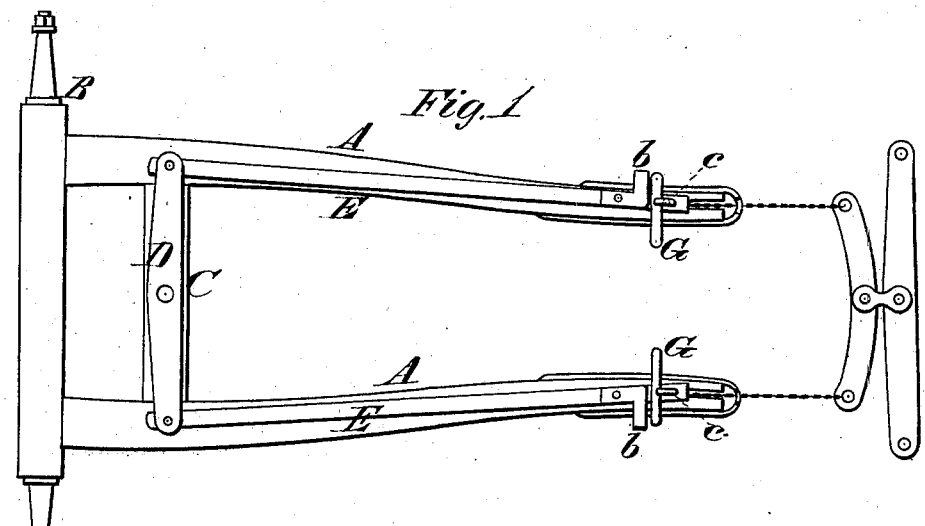
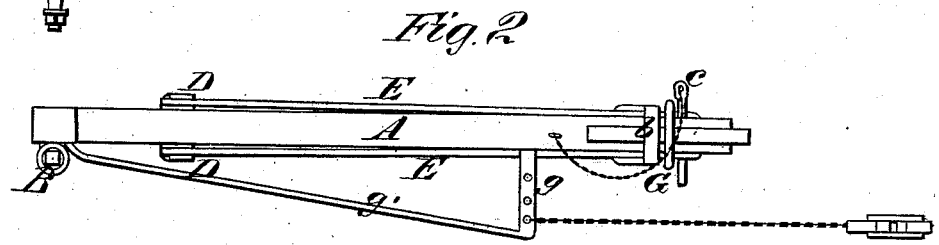
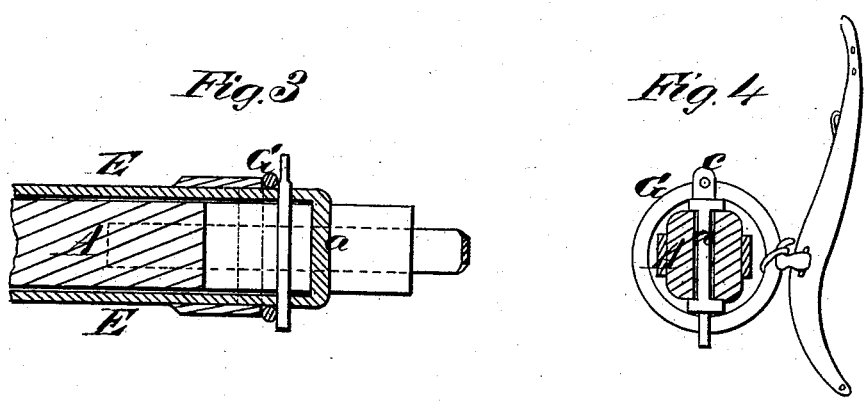
WITNESSES
INVENTOR
Amos Whittemore,
ATTORNEYS 2 Sheets--Sheet 2.
A. WHITTEMORE.
Draft-Evener.
No. 165,395. Patented July 6, 1875.
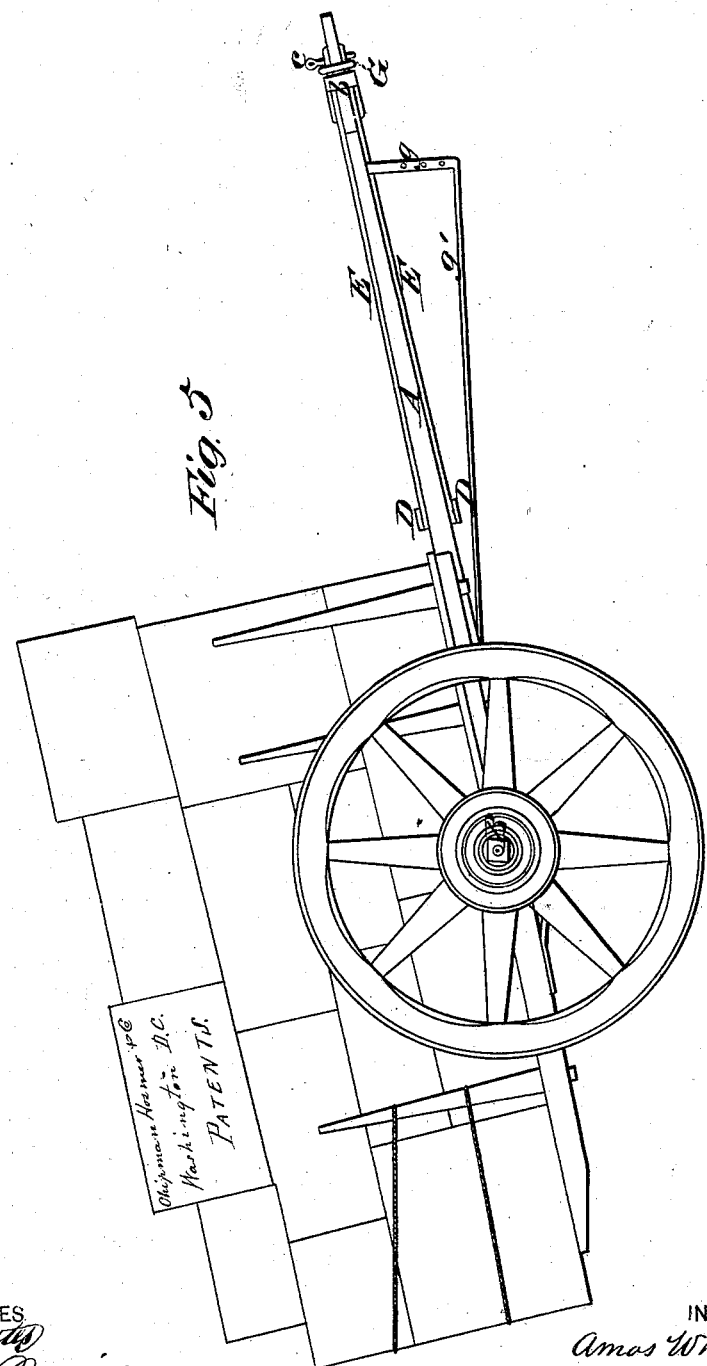

UNITED STATES PATENT OFFICE.

AMOS WHITTEMORE, OF CAMBRIDGEPORT, MASSACHUSETTS.

IMPROVEMENT IN DRAFT-EVENERS.

Specification forming part of Letters Patent No. 165,395, dated July 6, 1875; application filed December 26, 1874.

*To all whom it may concern:*

Be it known that I, AMOS WHITTEMORE, of Cambridgeport, in the county of Middlesex and State of Massachusetts, have invented a new and valuable Improvement in Draft-Eveners; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a plan view of my draft-evener. Fig. 2 is a side view of the same, and Figs. 3 and 4 are detail views. Fig. 5 is a side view of a cart having my device attached.

This invention has relation to draft-eveners, which are designed more especially for vehicles which are used for drawing very heavy loads; and the nature of my invention consists in a novel combination of draft-bars and whiffletrees with thills and hitching-rings, hereinafter explained, whereby the draft-bars will accommodate themselves to the shoulder movements of the animal in walking. It also consists in providing means for hitching a leader-horse to the thills so that he will draw in a direct line with the axle, as will be understood from the following description.

My objects are, mainly, to prevent the shoulders and breasts of horses from being chafed, and also to prevent the leader horse from drawing down upon the draft horse in the shafts.

In the annexed drawings, A A designate thills, which are secured to the bed of an axle, B, and C designates a cross-bar, to the upper and lower sides of which whiffletrees D D are pivoted. To the ends of the two whiffletrees draft-rods E E are pivoted, which extend along on the upper and lower sides of the thills, and are united by vertical portions $a$, which are received in slots made through the thills. The ends of the thills are provided with straps, which form loops, to which the leader horse may be hitched. I prefer, however, to hitch the draft-chains of the leader horse below the thills, as will be hereinafter explained. Near the front connection of the draft-rods E, and rigidly secured thereto, are semicircular bearings $b$, which are on the outer sides of the thills, but do not touch them. G G designate rings, which, in practice, are attached to chains on the hames. These rings are slipped on the ends of the draft-rods and against the bearings $b$, and are held in their places by means of removable pins $c$, which are passed through holes made through the draft-rods in front of the bearings $b$. Thus applied, the rings cannot bind on the thills, for the reason that when the draft is on them they are held by the bearings $b$ and pins $c$ squarely across the thills.

For the purpose of preventing a leader horse from drawing down upon the horse in the shafts, I attach the draft-chains of the leader horse to vertical portions $g$, which depend from the thills, and are held by rods $g'$, extending back and secured to the axle or axle-bed. By this means the draft of the leader horse can be brought in a direct line with the axle, so that he will draw to the best advantage.

What I claim as new, and desire to secure by Letters Patent, is—

1. The draft-rods E E, above and below the thills, pivoted to whiffletrees D D, and connected together at their front ends, in combination with bearings $b$ and pins $c$, substantially as and for the purposes described.

2. The draft portions $g$ below the thills, in combination with the sustaining-rod $g'$, substantially as described.

In testimony that I claim the above I have hereunto subscribed my name in the presence of two witnesses.

AMOS WHITTEMORE.

Witnesses:
GEORGE E. UPHAM,
JOHN B. CORLISS.